United States Patent [19]

Lange

[11] 4,304,303
[45] Dec. 8, 1981

[54] THREE-POINT HITCH DRAFT CONTROL

[75] Inventor: Henry J. Lange, Juneau, Wis.

[73] Assignee: Deere & Company, Moline, Ill.

[21] Appl. No.: 130,785

[22] Filed: Mar. 17, 1980

[51] Int. Cl.³ .......................................... A01B 63/112
[52] U.S. Cl. ..................................... 172/239; 172/10; 280/446 A
[58] Field of Search ..................... 172/7, 9, 10, 11, 12, 172/239; 280/405 B, 446 A, 456 A, 460 A, 461 A

[56] References Cited

U.S. PATENT DOCUMENTS

| | | | |
|---|---|---|---|
| 2,887,166 | 5/1959 | Vogelaar | 172/9 |
| 2,971,589 | 2/1961 | Du Shane | 172/239 |
| 3,106,253 | 10/1963 | Silver et al. | 172/239 |
| 3,213,945 | 10/1965 | Doering | 172/239 |
| 3,552,772 | 1/1971 | Scott | 280/405 B |
| 3,708,017 | 1/1973 | Alexandrovsky et al. | 172/239 |
| 3,768,568 | 10/1973 | Pitsch | 172/7 |
| 3,768,570 | 10/1973 | Green | 172/9 |
| 4,039,201 | 8/1977 | Huitema | 280/461 A |

FOREIGN PATENT DOCUMENTS 258286  1/1964  Australia ................................. 172/7
1071998 12/1959  Fed. Rep. of Germany ...... 172/239

Primary Examiner—Richard T. Stouffer

[57] ABSTRACT

The draft control consists of a three-point hitch mechanism which automatically raises or lowers the hitched implement so that a predetermined draft load can be maintained. An increase or decrease draft load on the implement is sensed by an upper hitch arm. A linkage mechanism transfers this force through a number of links of proper length, such that, the implement is raised with excessive draft load and lowered the implement as the draft load decreases from the excessive level. The draft load that is to be maintained is determined by the location of the middle link in one of a plurality of holes in the attaching linkage. Structure is provided to lock out the draft control.

5 Claims, 5 Drawing Figures

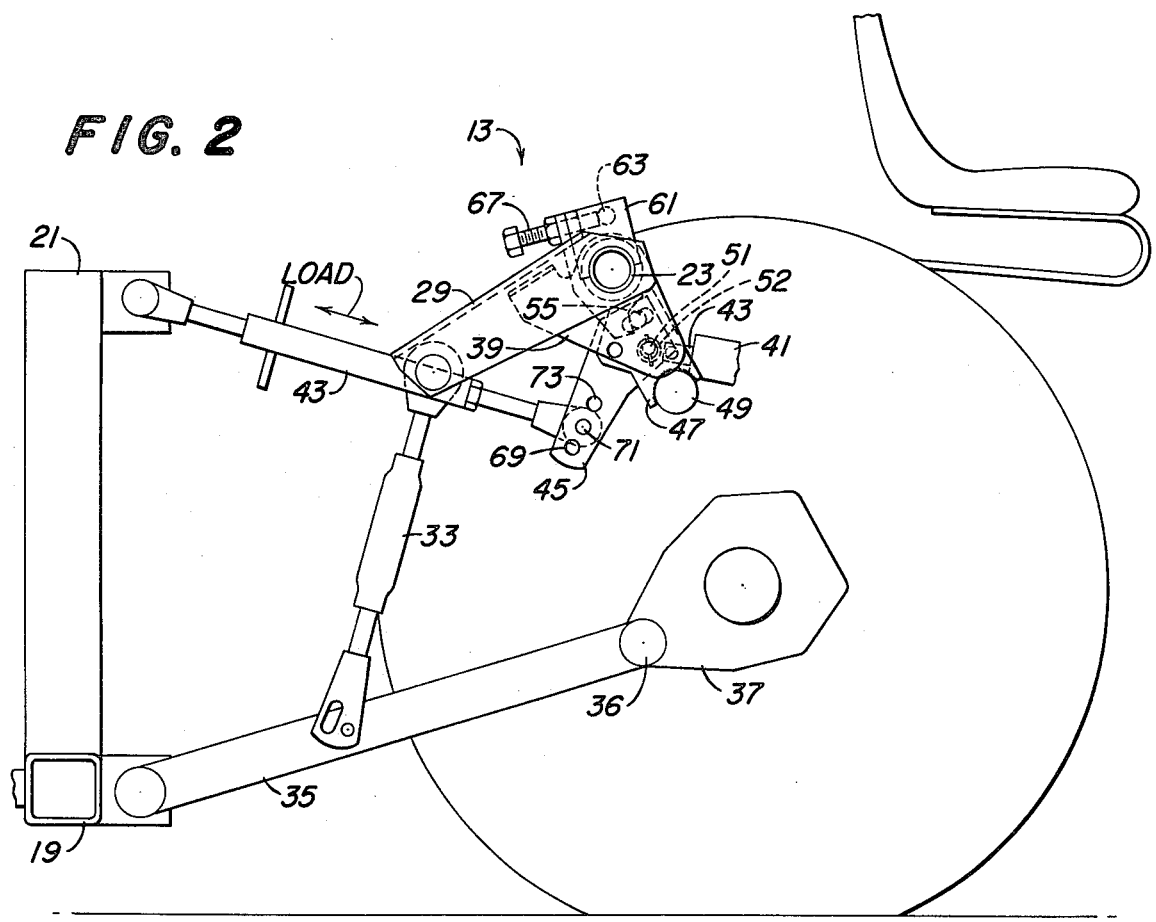
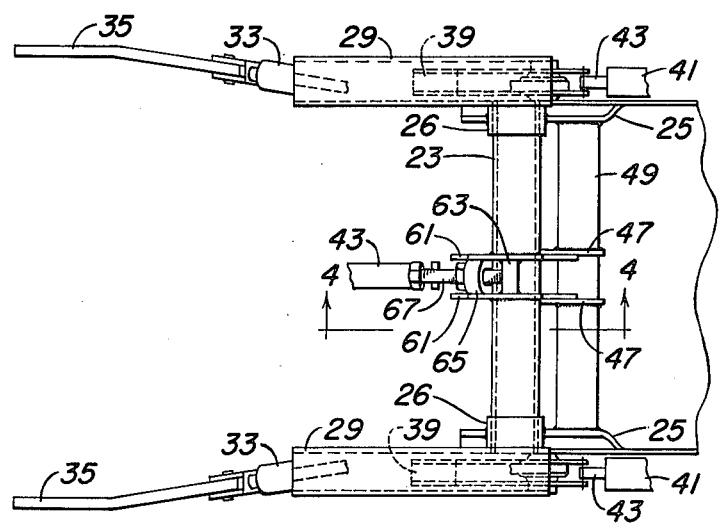

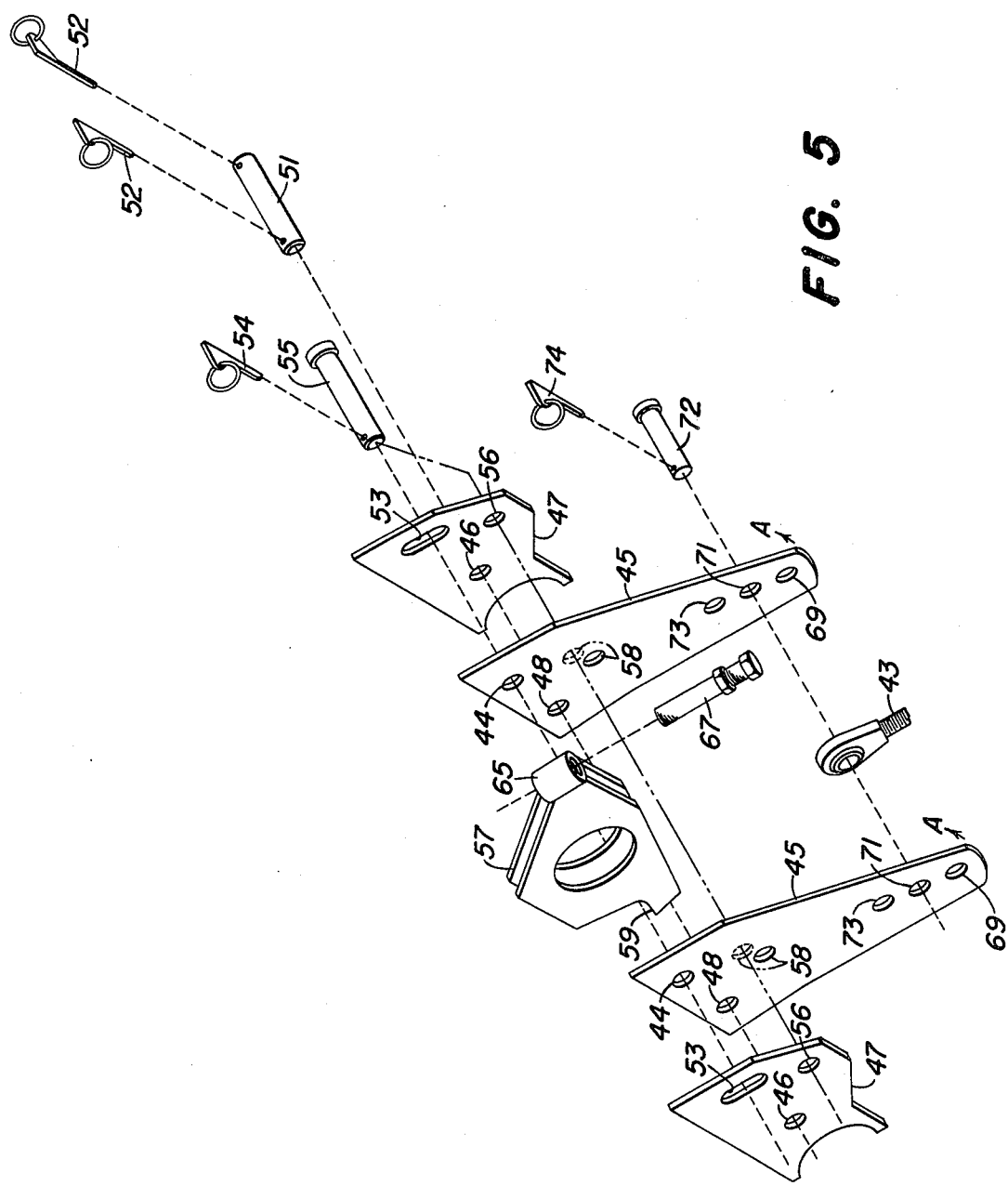

4,304,303

THREE-POINT HITCH DRAFT CONTROL

BACKGROUND OF THE INVENTION

This invention relates to draft controls, and more particularly, to mechanically load-responsive three-point hitch draft controls.

It is customary for large vehicles, such as large farm tractors to utilize a three-point hitch for the attachment of implements. The vehicle is subjected to draft loads which are a result of ground resistance to the ground-engaging implement. A conventional means of controlling the draft load on the vehicle produced by the ground-engaging implement is to utilize servodraft control systems.

As the lawn and garden tractor has grown in size, it has become increasingly popular to utilize three-point hitch assemblies for the attachment of ground-engaging implements thereto. The utilization of three-point hitches on lawn and garden tractors enables the operator greater control over the implement and also the ability to use larger implements. The use of servo control systems in lawn and garden size tractors equipped with three-point hitches is economically disadvantageous.

The present invention presents a load-responsive mechanical draft control system particularly suited for deployment in lawn and garden size tractors having three-point hitches.

SUMMARY OF THE INVENTION

The draft control is particularly suited for deployment on lawn and garden sized tractors having a three-point hitch assembly. Rearwardly on the tractor rotatably mounted transverse to the frame of the tractor is a first shaft having fixably mounted thereon a plurality of lift arms. The lift arms are mounted generally perpendicular to the shaft and in parallel spatial alignment on the shaft. Each lift arm has pivotally mounted to its most rearwardly projecting end a connecting link. The other end of each connecting link is pivotally mounted to a respective lower linking or hitch arm which is in turn pivotally mounted to the vehicle frame. Rotatably placed around each end of the first shaft is a lifting pillow in communication with a hydraulic cylinder. The lift pillow is located beneath an associated lift arm to exert force thereon supplied by a corresponding hydraulic cylinder to cause the lift arm to raise thereby raising the respective lower hitch arm.

A second shift is placed parallel to and beneath the first shift. Spaced generally central along the first and second shafts are a plurality of cooperatively engaging linking members so arranged to allow a third or upper hitch arm to pivotally connect therewith.

An implement attached to the hitch arms will transmit a draft load through the upper hitch arm to the cooperatively engaging linking members. The linking members are so cooperatively engaging as to cause the first shift to rotate should the draft load exceed a predetermined amount and thereby raise the lift arms and as a result the lower hitch arms. By raising the lower hitch arms the attached implement is elevated with respect to the ground a sufficient amount to decrease the draft loads.

It is an objective of the present invention to present a load responsive mechanical draft control system for deployment on a vehicle having a three-point hitch. It is a further objective of the draft control system to allow it to be locked out of response.

BRIEF DESCRIPTION OF THE DRAWINGS

FIG. 2 is a side elevational view of the rearward portion of a vehicle including the three-point hitch and draft control.

FIG. 3 is a top view view of the hitch and draft control system.

FIG. 5 is an exploded view of draft linkage.

DETAILED DESCRIPTION OF THE PREFERRED EMBODIMENT

Figure 1:
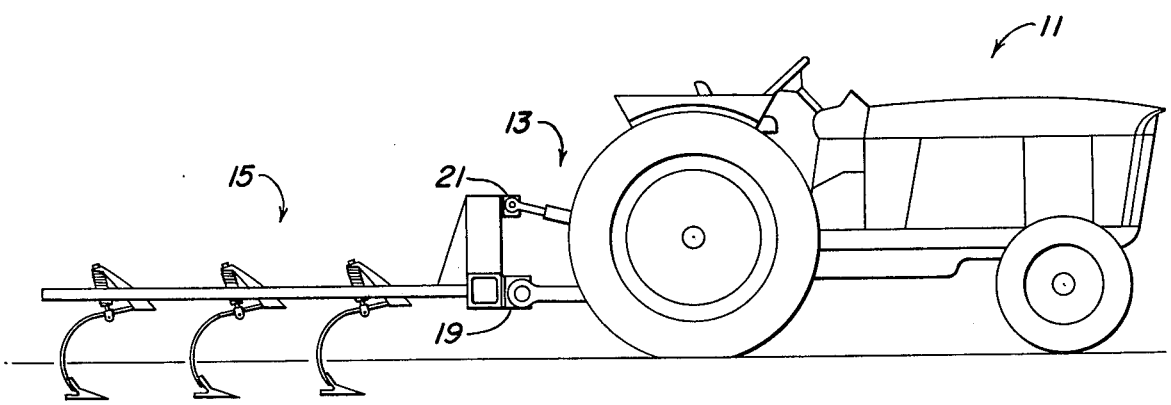
FIG. 1 is a side elevational view of a lawn and garden type tractor having a 3-point hitched pull-behind implement.

Referring to FIG. 1, a tractor 11 having a hitch assembly 13 has attached thereto a ground-engaging implement 15. The ground-engaging implement 15 is attached to the hitch assembly 13 by implement linking arms 19 and 21. It is apparent that the vehicle will experience a draft loading as the ground-engaging implement 15 is pulled by the tractor 11.

Referring more particularly to FIGS. 2 and 3 the rearward section of the tractor 11 has support plates 25 which is fixably mounted by any conventional means to each side of the vehicle frame (not shown) of tractor 11. Fixably mounted by any conventional means to each support plate 25 is a shaft support ring 26. A lift shaft 23 is passed through the support rings 26 such that shaft 23 can rotate therein. Fixably mounted by any conventional means to each end of the shaft 23 just beyond support rings 26 is a lift arm 29 extending generally perpendicular from the shaft 23. Pivotally mounted by any conventional means to the rearward projecting end of each lift arm 29 is one end of an adjustable lift link 33. The other end of each lift link 33 is pivotally mounted by any conventional means to a respective lower hitch arm 35. The lift link 33 is mounted to the respective lower linking arm 35 at a point therealong generally rearwardly of the midpoint. One end of each lower hitch arm 35 is pivotally mounted by any conventional means to the vehicle axle housing 37. The adjustable lift links 33 are mounted to the respective lower hitch arm 35 at a point to facilitate pivoting or rotation of the lower hitch arm about the axle attachment point 36 upon movement of the respective lift arm 29.

Beneath each lift arm 29 placed in an abutting relationship with the under side of the respective lift arm 29, is a lift pillow 39 rotatably mounted by any conventional means around shaft 23. Each lift pillow 39 communicates with a respective hydraulic cylinder 41 such that the extention or retraction of the cylinder arm 43 of hydraulic cylinder 41 causes the respective lift pillow 39 to rotate about shaft 23 to thereby pivotally move the respective lift arm 29 which rest on the abutting surface of lift pillow 39.

Figure 4:
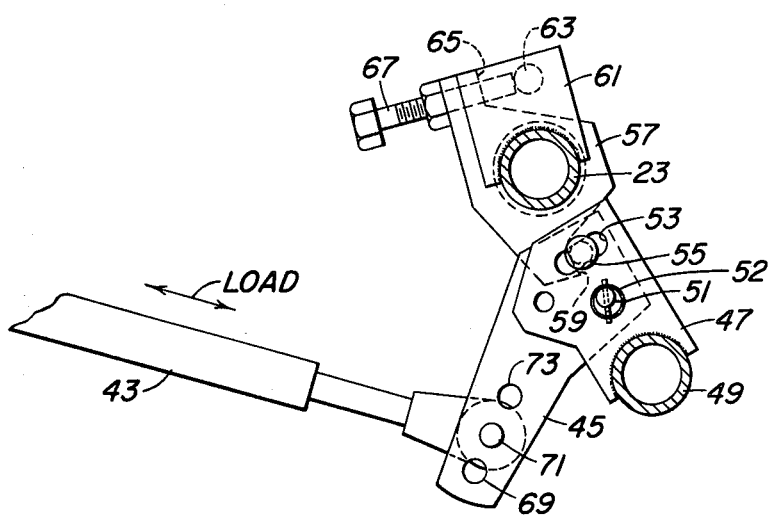
FIG. 4 is a side view taken on the line 4—4 of FIG. 3.

Referring to FIGS. 4 and 5, an upper hitch arm 43 is pivotally mounted at one end by any conventional means between two first link members 45. The first link members 45 are placed between two linking plates 47. Each linking plate 47 is fixably mounted by any conventional means to a second shaft 49 which extends between and is fixably mounted by any conventional means to support plates 25. A pivot pin 51 is passed through holes 46 in the linking plates 47 and a hole 48 in the first linking members 45 to pivotally maintain the linking members 45 between linking plates 47. Any conventional means can be used to maintain the position of the pivot pin 51 such as passing clip pins 52 through the ends pivot pin 51 external to linking plates 47. A slot 53 is contained within each linking plate 47 cooperatively aligned such that a headed pin 55 placed through a hole 44 in the first linking members 45 can slidably move within the confines of the slot 53. Pin 55 extending generally perpendicular to linking members 45 and linking plates 47. Longitudinal motion of pin 55 is restricted by the pin head at one end and a clip pin 54 passed through the pin 55 at the other end.

A second linking member 57 is placed around shaft 23 such that linking member 57 can freely rotate thereon. Linking member 57 has an abutting surface 59 abutting the pin 55. Linking member 57 is positioned on shaft 23 between a pair of parallel plates 61 fixably mounted to shaft 23 by any conventional means, the abutting surface being between the first linking members 45. Fixably mounted by any conventional means to and between plates 61 and oriented generally perpendicular thereto is a stop pin 63. Linking member 57 has a cylindrically shaped portion indicated as 65 positioned opposite to the stop pin 63 and generally perpendicular to plates 61. A threaded screw 67 is passed through portion 65 in threading engagement with portion 65 aligned to contact the stop pin 63.

In operation an excessive draft load developed as a result of engagement between the implement 15 and the ground, as indicated in FIGS. 1 and 2, is transmitted to upper hitch arm 43 from the implement attaching arm 21. The draft load is thereby received by first linking member 45 causing linking member 45 to pivot about pivot pin 51. As a result of the rotation of linking member 45 pin 55 moves within slot 53 of linking plates 47. The motion of pin 55 as received by contact surface 59 of member 57 causes screw 67 to displace stop pin 63 resulting in rotation of shaft 23. The rotation of shaft 23 causes lift arms 29 to raise above the lift pillows 39 resulting in the raising of hitch arms 35 and, thereby, implement 15. Should the draft load decrease, the decreasing load will allow the pin 55 to slide within slot 53 such that lift arms 29 are lowered to their original set position thereby lowering the implement 15 to the initial level.

Referring to FIG. 4 and more particularly to FIG. 5, to lock out draft response, first linking member 45 is raised in the direction of arrow A, such that a hole 58 in it will assume a colinear orientation to co-linearly placed holes 56 in plate members 56. Pin 55 is relocated to pass through holes 56 and 58, thereby locking out the draft response.

First linking member 45 has three holes 69, 71 and 73 to accommodate the attachment of upper hitch arm 43 to linking member 45. The magnitude of excess load necessary to cause raising of the implement 15 is determined by which hole 69, 71, or 73 used to accommodate the attachment of link 43. The greatest load is required by using hole 73 and the least load is required by using hole 69. The normal draft load is determined by the initial positioning of lift arms 29.

I claim:

1. A draft control mechanism for tractors having three-point hitch means for attachment of ground-engaging implements to said tractor, comprising:
   (a) a plurality of lower hitch arms, each lower hitch arm pivotally mounted rearwardly on said tractor;
   (b) a first shaft;
   (c) a second shaft;
   (d) support means for rotatably supporting said first shaft to said rearward end of said tractor such that said first shaft extends generally transversely to said tractor, and for fixably supporting said second shaft to said tractor generally parallel to and forwardly displaced from said first shaft;
   (e) a plurality of lower hitch arms;
   (f) a plurality of lift arms fixably mounted to said first shaft;
   (g) means for communicating motion of said lift arm to said lower hitch arms:
   (h) means for raising said lift arms, said lift arms to rest on said means;
   (i) an upper hitch arm;
   (j) a plurality of plate linking members fixably mounted to said second shaft and extending generally perpendicular thereto, said plate members to a cooperatively aligned slots therein;
   (k) a plurality of first linking members pivotally mounted between said linking plate members, said first linking members including a pin extending generally perpendicular therefrom into said slots of said linking plate members, said upper hitch arm to be pivotally mounted to and between said first linking members such that generally linear displacement of said upper link arm causes said first linking members to pivot resulting in movement of said pin in said slots;
   (l) a second linking member rotatably mounted on said first shaft having an abutting surface to said pin of said first linking member such that movement of said pin in said slot will cause said second linking member to rotate on said first shaft;
   (m) means for transferring rotation of said second linking member to rotation of said first shaft.

2. A draft control mechanism as claimed in claim 1 wherein said transferring means, comprises:
   (a) a plurality of plate members fixably mounted to said first shaft such that said second linking members are therebetween;
   (b) a stop pin fixably mounted to said plate members and extending generally perpendicular thereto;
   (c) a screw in threaded engagement with said second linking member such that said screw can abut said stop pin.

3. A draft control mechanism for tractors having three-point hitching means for the attachment of ground-engaging implements to said tractor, comprising:
   (a) a plurality of lower hitch arms, each hitch arm pivotally mounted rearwardly on said tractor;
   (b) a first shaft;
   (c) first support means for rotatably supporting said first shaft to said rearward end of said tractor such that said shaft extends transverse to said tractor;
   (d) lift arm fixably mounted to said shaft;
   (e) means for communicating motion of said lift arm to said lower hitch arms;
   (f) first means for raising or lowering said lift arms;
   (g) an upper hitch arm;
   (h) draft load sensing means for receiving draft loads from said upper hitch arm and mechanically translating said draft load to an angular displacement of said first shaft when said draft load exceeds a predetermined amount, including:

(1) a first linking member pivotally mounted to said upper hitch arm;

(2) second support means for pivotally supporting said first linking member;

(3) a second linking member fixably mounted around said first shaft; and (4) third means for translating pivotal motion of said first linking member about said second support means to a rotation of said second linking member whereby excessive draft loads are received by said upper hitch arm to pivotally displace said first linking member.

4. A draft control mechanism for tractors having three-point hitching means for the attachment of ground-engaging implements to said tractor, comprising:

(a) a plurality of lower hitch arms, each hitch arm pivotally mounted rearwardly on said tractor;

a first shaft;

(c) first support means for rotatably supporting said first shaft to said rearward end of said tractor such that said shaft extends transverse to said tractor;

(d) lift arm fixably mounted to said shaft;

(e) means for communicating motion of said lift arm to said lower hitch arms;

(f) first means for raising or lowering said lift arms, including:

(1) a lift pillow placed around said first shaft and rotatable thereon, said lift pillow to have an abutting surface to abut said lift arm; and (2) means for rotating said lift pillow, (g) an upper hitch arm; and (h) draft load sensing means for receiving draft loads from said upper hitch arm and mechanically translating said draft load to an angular displacement of said first shaft when said draft load exceeds a predetermined amount.

5. A draft control mechanism as claimed in claims 3 or 4, further comprising means to lock out said draft control mechanism.

* * * * *